United States Patent [19]

Iwano et al.

[11] Patent Number: 6,006,891

[45] Date of Patent: Dec. 28, 1999

[54] CONTAINER CARRYING APPARATUS

[75] Inventors: Fumiyuki Iwano; Satoshi Kume; Tetsuya Iuchi; Shigenori Tawa; Michio Ueda, all of Tokushima-ken, Japan

[73] Assignee: Shikoku Kakoki Co., Ltd., Tokushima-ken, Japan

[21] Appl. No.: 08/925,643

[22] Filed: Sep. 9, 1997

[30] Foreign Application Priority Data

Sep. 17, 1996 [JP] Japan .................................... 8-244708

[51] Int. Cl.$^6$ .................................................. B65G 47/24
[52] U.S. Cl. ...................... 198/417; 198/803.1; 198/404
[58] Field of Search .................................. 198/402, 403, 198/404, 417, 803.1, 803.13

[56] References Cited

U.S. PATENT DOCUMENTS

| | | | |
|---|---|---|---|
| 2,667,958 | 2/1954 | Malhiot | 198/417 X |
| 2,953,240 | 9/1960 | Nigrelli et al. | |
| 3,019,886 | 2/1962 | Winkler et al. | 198/803.1 X |
| 3,314,522 | 4/1967 | Croall | 198/417 |
| 5,474,168 | 12/1995 | Leslie et al. | 198/803.13 X |
| 5,765,675 | 6/1998 | Draghetti et al. | 198/417 X |

FOREIGN PATENT DOCUMENTS

| | | |
|---|---|---|
| 078 329 A1 | 6/1997 | European Pat. Off. |
| 395350 | 5/1924 | Germany . |

OTHER PUBLICATIONS

European Search Report for European Application No. EP 97 11 5913.2–1261, and annex.

*Primary Examiner*—James R. Bidwell
*Attorney, Agent, or Firm*—Smith, Gambrell & Russell, LLP

[57] ABSTRACT

A container carrying apparatus capable of carrying out containers at high speed with reliability wherein the container is filled with juice, etc. and is manufactured by a filling and packaging apparatus, particularly by a high speed filling and packaging apparatus. The containers are carried out by the container carrying apparatus comprising an intermittent driving container carriage conveyor which nips each container at front and rear portions thereof in a carrying direction while each container having a top and a bottom is carried in an upside down state, and which is movable in a direction crossing at right angles with the carrying direction, a cylindrical guide member extending in a direction crossing at right angles with the conveyor, a guide rod provided in the cylindrical guide member, and a pressing member for discharging containers from the conveyor and pressing containers in the cylindrical guide member.

5 Claims, 6 Drawing Sheets

CONTAINER CARRYING APPARATUS

BACKGROUND OF THE INVENTION

1. Field of the Invention

The present invention relates to a container carrying apparatus for carrying out rectangular parallelepiped containers for juice, etc. which are manufactured by a filling and packaging apparatus.

2. Prior Art

As shown in FIG. 1, a rectangular parallelepiped container 1, which is filled with juice, etc. and manufactured by a filling and packaging apparatus, has a top 2 and a bottom 3. A package container of this type is first formed as a pillow-like container by the filing and packaging apparatus, then it is bent at the ends thereof to be shaped in a rectangular parallelepiped container while it is carried by an intermittent driving container carriage conveyor in an upside down state. Then, as shown in FIG. 2, the container 1 stops at a container discharge position, and the upper portion of the container 1 is scraped off by a pressing pin 5 provided on a continuous endless chain 4 arranged in a longitudinal direction of the container 1 (container carrying direction of the intermittent driving container carriage conveyor) so that the container 1 is turned upright and carried out.

However, in the conventional container carrying apparatus, the discharge of the container filled with juice, etc. must be performed in turn by an upper scraping mechanism 6 provided in a small space defined in a conveyor carrying direction of the intermittent driving container carriage conveyor. If such a conventional container carrying apparatus is applied to a high-speed filling and packaging apparatus having a capacity of manufacturing 7,000 packs or more per hour, particularly, 8,000 packs or more per hour, the discharge by the container upper scraping mechanism is made unstable. Even if the containers can be discharged, there frequently occurs the following problem in a mechanism for turning the containers upright by transferring the containers aslant upward in the advancing direction, then dropping the containers while they are turned upside down. That is, there occurs a problem that the container is crushed or turned upside down owing to the impact when it is inverted and dropped since the container is transferred at high speed.

SUMMARY OF THE INVENTION

It is an object of the present invention to provide a container carrying apparatus capable of carrying out containers filled with juice, etc. at high speed with reliability wherein the containers are manufactured by a high-speed filling and packaging apparatus.

The inventors of this application have endeavored themselves to study for developing a container carrying apparatus capable of carrying out containers at high speed with high reliability, which containers are filled with juice, etc., and manufactured by a high-speed filling and packaging apparatus having a capacity of manufacturing 7,000 packs or more per hour, particularly 8,000 packs or more. As a result of study, they have confirmed that rectangular parallelepiped containers each having a top and a bottom are not discharged in the container carrying direction of an intermittent driving container carriage conveyor as made in the conventional carrying apparatus but discharged in a direction crossing at right angles with the container carrying direction, then the containers are turned upright so as to carry out the containers at high speed with reliability which containers can be manufactured by a conventional filling and packaging apparatus as well by a high-speed filling and packaging apparatus having a capacity of manufacturing 7,000 packs or more per hour, particularly 8,000 packs or more per hour. The inventors completed this invention based on this confirmation.

That is, it is a first aspect of the invention to provide a container carrying apparatus for discharging rectangular parallelepiped containers from an intermittent driving container carrying conveyor by nipping each parallelepiped container at front and rear portions thereof in a carrying direction while each rectangular parallelepiped container having a top and bottom is carried in an upside down state, wherein the intermittent driving container conveyor is movable in a direction crossing at right angles with the carrying direction, and wherein the apparatus comprises a means for discharging each rectangular parallelepiped container in a direction crossing at right angles with a conveyor carrying direction of the intermittent driving carriage conveyor wherein the rectangular parallelepiped container stops at a container discharge position of the intermittent driving carriage conveyor, preferably stops in a stable state where each container is inclined aslant upward in an advancing direction, and a means composed of an upright guide member and a container pressing member for turning each container upright.

It is a second aspect of the invention to provide a container carrying apparatus for discharging rectangular parallelepiped containers comprising an intermittent driving container carriage conveyor, by nipping each parallelepiped container at front and rear portions thereof in a carrying direction while each rectangular parallelepiped container having a top and bottom is carried in an upside down state, wherein the intermittent driving container conveyor is movable in a direction crossing at right angles with the carrying direction, a guide member extending in a direction crossing at right angles with the conveyor, and a container pressing member for discharging the containers from the intermittent driving carriage conveyor, and pressing the containers which are guided by the guide member while turning the containers, wherein the container pressing member has a mechanism for pressing the container at a region including a gravity or rotary center thereof.

BRIEF DESCRIPTIONS OF THE DRAWINGS

PREFERRED EMBODIMENT OF THE INVENTION

A container carrying apparatus according to the present invention will be now described with reference to the attached drawings. The present invention is however not limited to the embodiment set forth hereunder and illustrated in the attached drawings.

Figure 1:
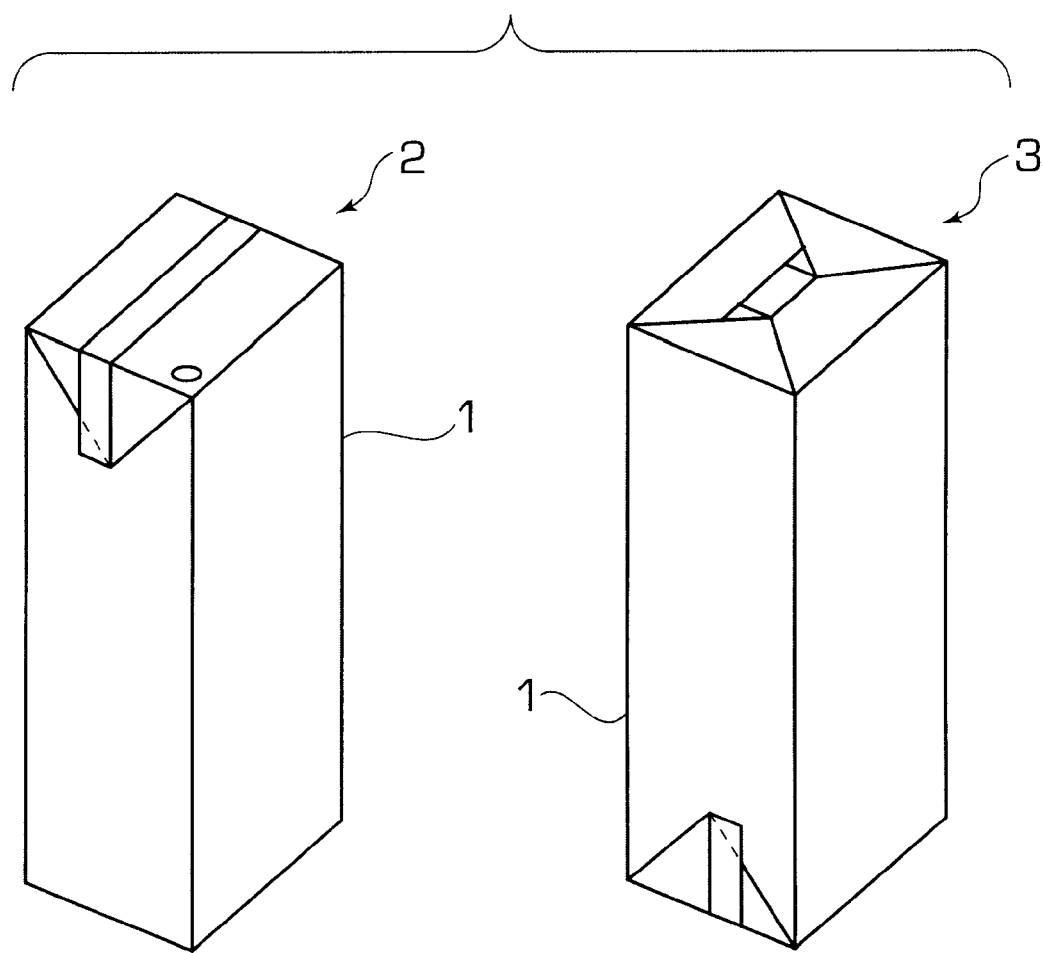
FIG. 1 is perspective views of a rectangular parallelepiped container as viewed from a top and a bottom thereof.
Figure 2:
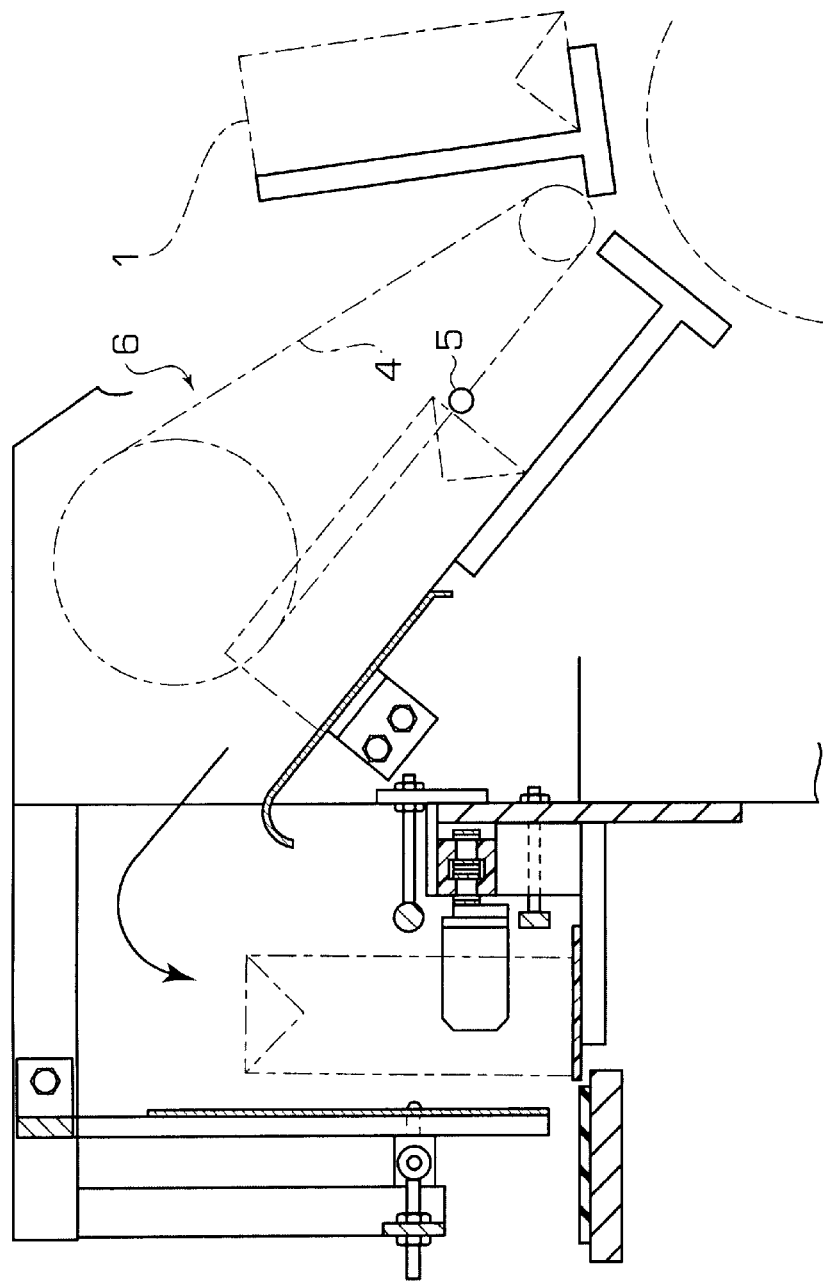
FIG. 2 is a longitudinal sectional view of a conventional container discharge apparatus.
Figure 3:
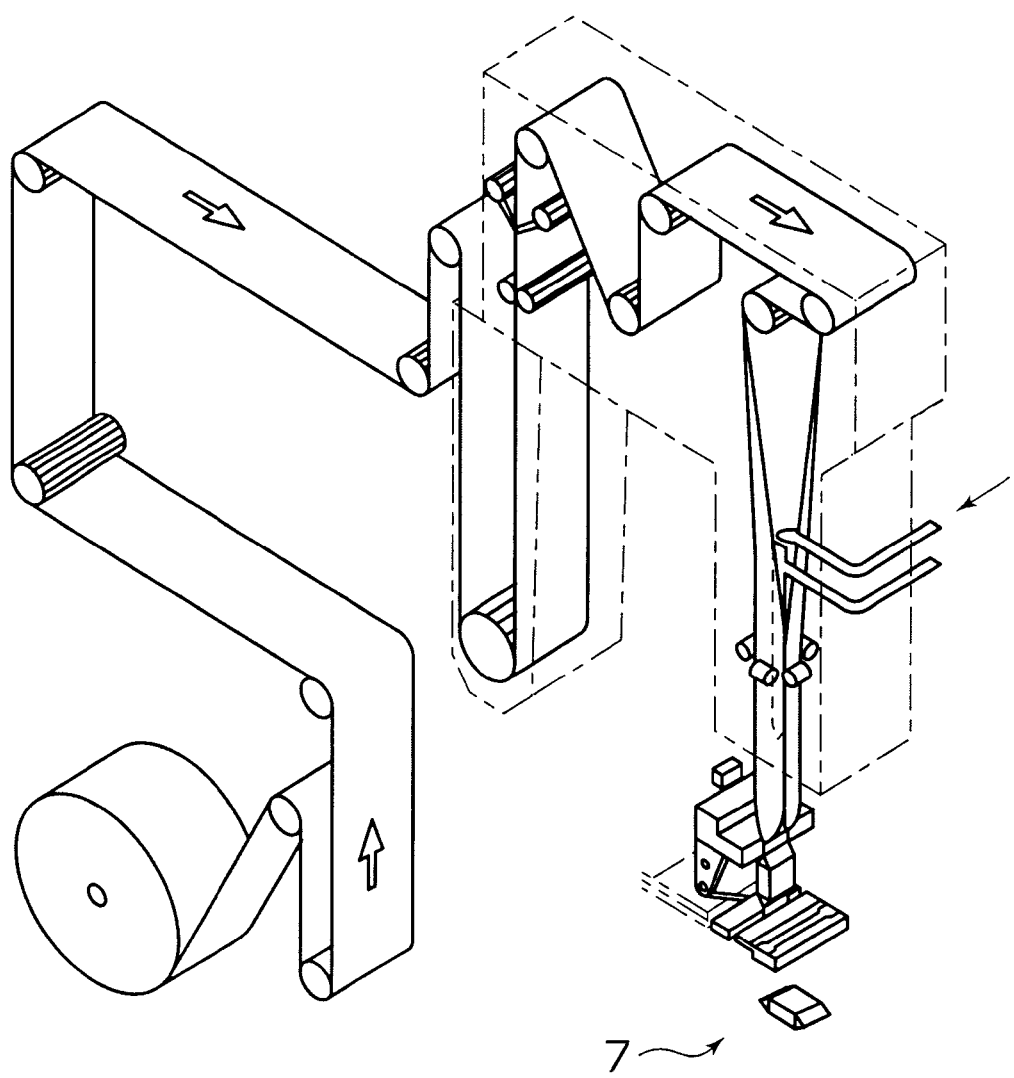
FIG. 3 is a schematic perspective view of a filling and packaging apparatus.

A rectangular parallelepiped container filled with juice, etc. and having a top and a bottom is manufactured by a high-speed filling and packing apparatus, for example, as illustrated in FIG. 3. That is, a packaging material web in a rolled state is wound in order, then it is formed in a tubular shape after it is sterilized, and successively it is filled with juice, etc., then it is laterally sealed and cut to be formed in a pillow-like container 7.

Then, the pillow-like container 7 is carried by an intermittent driving container carriage conveyor (hereinafter referred to simply as conveyor) 10 while it is turned upside down, and it is bent at the ends thereof, and finally it is shaped in a rectangular parallelepiped container 1.

Figure 4:
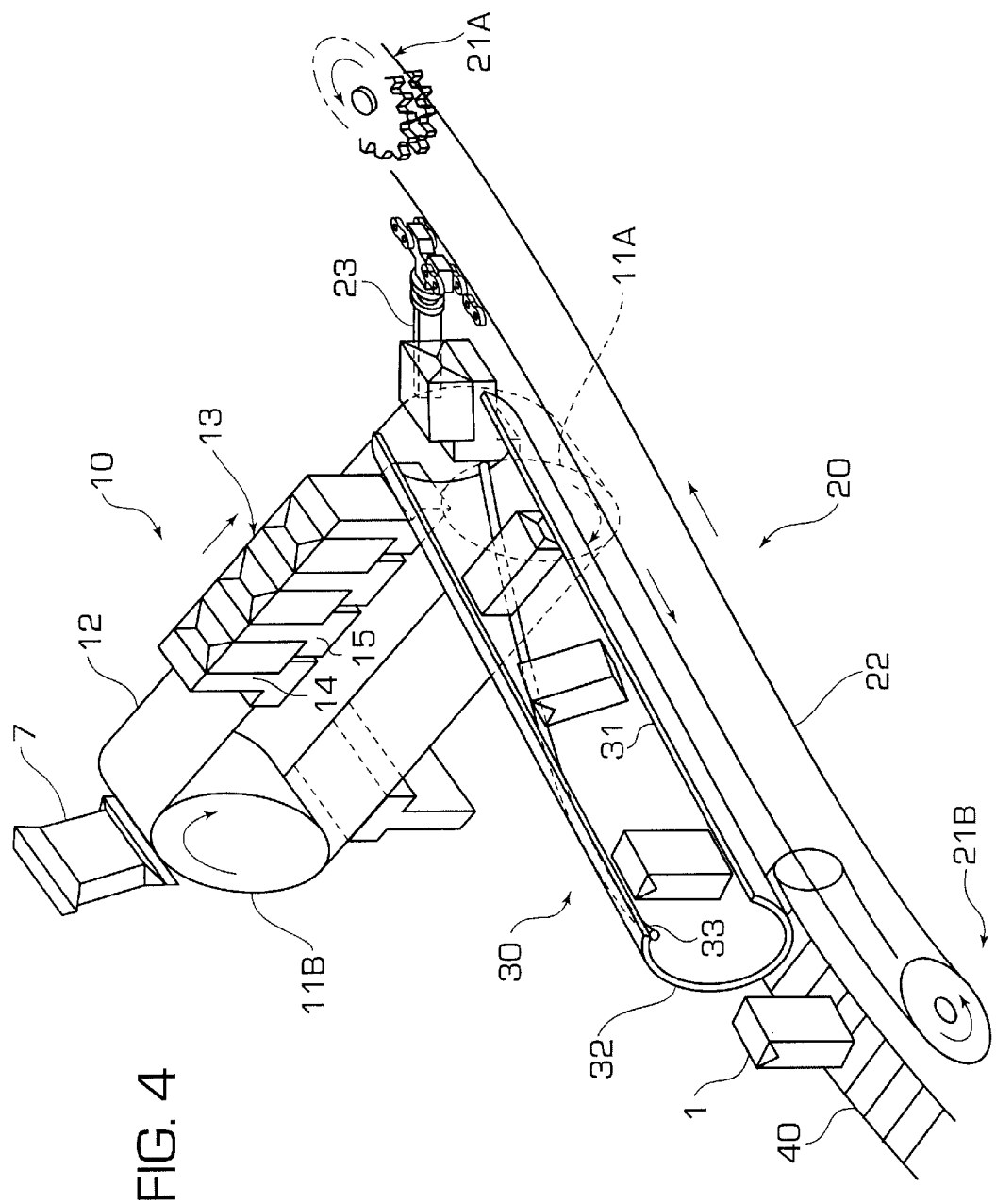
FIG. 4 is a perspective view of a container carrying apparatus according to the present invention.
Figure 5:
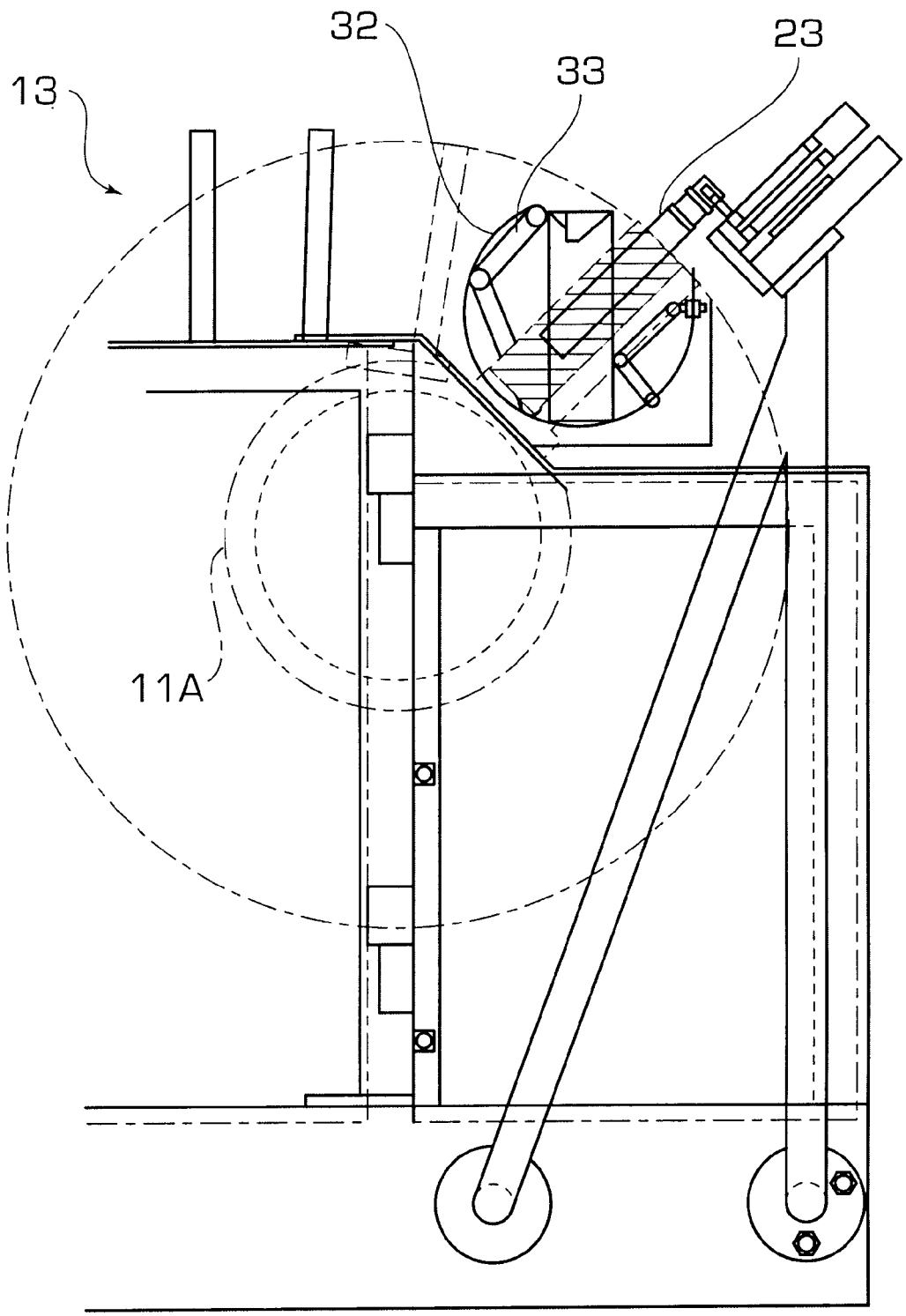
FIG. 5 is a longitudinal sectional view of the container carrying apparatus in a container discharge position.

As shown in FIGS. 4 and 5, the conveyor 10 includes a pair of sprockets 11A and 11B which are respectively disposed at the front and rear portions thereof, a pair of endless chains 12 entrained around the sprockets 11A and 11B, and a plurality of holders 13 which are secured to the pair of endless chains 12 so as to extend thereover.

Each holder 13 of the conveyor 10 is formed of a T-shape comprising a side plate 14 and a bottom plate 15. When the holder 13 moves on the upper side of the endless chains 12, the side plates 14 of the two adjoining holders 13 are in parallel with each other, and the bottom plates 15 thereof stretch in a straight line. The rectangular parallelepiped containers 1 are nipped between the slide plates 14 of the holders 13 in the advancing direction, while they are received by the bottom plates 15 while extending over the bottom plates 15 of the holders 13 so that the rectangular parallelepiped containers 1 are held by the holders 13.

When the holders 13 stop at a container discharge position (see FIG. 5) while they turn about the sprockets 11A, the inclination angles of the adjoining front and rear slide plates 14 of the holders 13 are open to expand at the tip ends thereof so that the rectangular parallelepiped containers 1 are easily taken out between the holders 13. At this time, since the rectangular parallelepiped containers 1 are held in a stable state where they are inclined aslant upward in an advancing direction, and hence they can be discharged with high stability compared with the case where they are turned upside-down in a state where the tops thereof are inverted.

A discharge unit 20 provided with a container pressing means is disposed at the terminal end of the conveyor 10. The discharge unit 20 comprises a pair of sprockets 21A and 21B, an endless chain 22 entrained around the sprockets 21A and 21B and a plurality of L-shaped plates 23 which are respectively secured to the endless chain 22 and spaced uniformly. The endless chain 22 is entrained around the sprocket 21A which drives in a direction crossing at right angles with the conveyor 10 and the sprocket 21B which is driven by the sprocket 21A.

Figure 6:
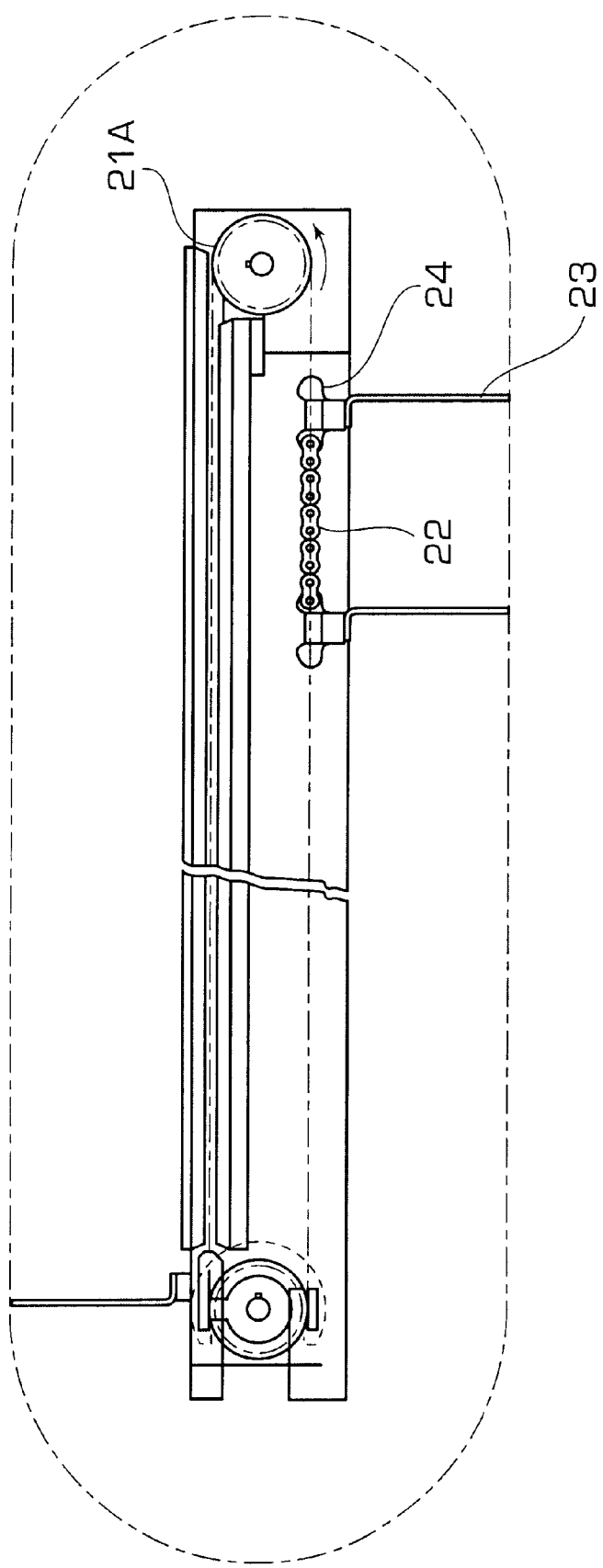
FIG. 6 is a plan view of a discharge unit in the container discharge apparatus.

As shown in FIG. 6, the L-shaped plates 23 are respectively secured to the endless chain 22 via elastic members 24 such as rubber and spaced uniformly, and they move while crossing with a container discharge position where the holders 13 are stopped while they are turned around the sprockets 11A. The conveyor 10 and the endless chain 22 are adjusted to be synchronized to each other so that the L-shaped plates 23 pass while the conveyor 10 is stopping.

An upright guide unit 30 is disposed in the container discharge position at the side crossing at right angles with the contains carrying direction of the conveyor 10. The upright guide unit 30 comprises a cylindrical guide 32 having a recess 31 which guide 32 extends along the endless chain 22 of the discharge unit 20 and a guide rod 33 secured to the cylindrical guide 32.

The cylindrical guide 32 is provided in parallel with the endless chain 22 and has the recess 31 in a longitudinal direction through which the L-shaped plates 23 pass. Since the L-shaped plates 23 are secured to the endless chain 22 so as to always press rectangular parallelepiped container 1 at the region including the gravity or rotary center of the rectangular parallelepiped container 1 which moves inside the cylindrical guide 32, the rectangular parallelepiped container 1 contacts the guide rod 33 to be guided thereby at one end serving as the top, then it is smoothly carried while it is turned in the upright state.

A transfer conveyor 40 is disposed in a position extended from the cylindrical guide 32. The transfer conveyor 40 transfers the rectangular parallelepiped container 1, which is turned upright by the upright guide unit 30, to another processing position, not shown. Since the transferring speed of the transfer conveyor 40 is higher than the moving speed of the L-shaped plates 23, the L-shaped plates 23 do not turn the rectangular parallelepiped containers 1 upside down even if the former presses the latter when the former turns to a different direction at the sprocket 21B, namely, when the L-shaped plates 23 turn to the backward movement from the forward movement.

Inasmuch as the container carrying apparatus according to the present invention has the structure set forth above, when the holders 13 stop at the container discharge position, the L-shaped plates 23, which are respectively secured to the continuously driven endless chain 22, discharge the rectangular parallelepiped containers 1, which are in a stable state and inclined aslant upward in an advancing direction, in a direction crossing at right angles with the carrying direction of the conveyor 10. As a result, each of the discharged rectangular parallelepiped containers 1 contacts the guide rod 33 in the cylindrical guide 32 at a part of the top thereof, and also contacts the cylindrical guide 32 at a part of the bottom thereof. When the L-shaped plates 23 continue to press the rectangular parallelepiped containers 1, each rectangular parallelepiped container 1 is turned upright while sliding at the portion where it contacts the guide rod 33 and cylindrical guide 32, and the rectangular parallelepiped container which is thus turned upright is transferred to the transfer conveyor 40 while it is pressed by the L-shaped plates 23. When the transfer conveyor 40 increases its speed, each of the rectangular parallelepiped container 1 moves away from the L-shaped plates 23. Therefor, the L-shaped plates 23 return to the position with the conveyor 10 during the backward movement, then they repeat the pressing operation.

Although the preferred embodiment of the invention has been described above, the following embodiments are also included in the present invention.

Although each rectangular parallelepiped container 1 which is discharged from the container discharge position is turned upright by the upright guide unit 30 and then it is transferred to the transfer conveyor 40, a transferring means such as a shooter is appropriately provided in the position extended from the cylindrical guide 32 instead of the transfer conveyor 40. Further, there is a case where the rectangular parallelepiped container 1 is not necessarily turned upright. In such a case, the rectangular parallelepiped container 1, which is discharged from the container discharge position, is turned appropriately, and then it can be smoothly transferred to the next transferring means.

Although the cylindrical guide 32 and the guide rod 33 are employed in the preferred embodiment as a guide member of a container such as the upright guide unit 30, the guide member may be formed of any shape if it can turn the container upright such as a rail-shaped guide for guiding the bottom of a container and a guide rod.

The cylindrical guide 32 employed by the preferred embodiment is not limited to the circular shape but may be formed of various shapes such as a U-shape or a shape which is bent at right angles if it has a circular shape in cross section like the cylindrical member, which can freely set the carrying direction. Likewise, the shape of the guide rod 33 extending from the start point to the end point for guiding the container in the vicinity of the top thereof for turning the container upright may be of any shape such as a spiral form or a form which is bent at straight potions and continuous with one another.

Although the discharge of the rectangular parallelepiped container 1 from the conveyor 10 and the pressing of the rectangular parallelepiped container 1 inside the cylindrical guide 32 are respectively performed by the L-shaped plates 23, it may be performed by different pressing members. Further, the L-shaped plates 23 may not be L-shaped if they can press the rectangular parallelepiped container 1 with reliability, and they may be changed in shape from the plates to round rods, etc.

Further, although the discharge of the container is performed at the container discharge position while the holders 13 are turned around the sprockets 11A, the rectangular parallelepiped container 1 may be discharged at the container discharge position where the rectangular parallelepiped container 1 is turned upside-down on the conveyor 10. In the latter case, the rectangular parallelepiped container 1 is discharged through a turret which is adjacent to the conveyor 10, then it is reversed and turned upright by the turret, then it may be transferred.

According to the present invention, it is possible to carry out the containers filled with juice, etc. which are manufactured by a conventional filling and packaging apparatus as well as by a high-speed filling and packaging apparatus capable of manufacturing 7,000 packs or more per hour, particularly 8,000 packs or more per hour without crushing them or turning them upside down at high-speed with reliability.

Further, since the container discharge position of the conveyor is in a stable state where the container is inclined aslant upward and turned upside-down in an advancing direction, the containers which are carried at high speed can be carried out with stability as well as with reliability with less turning angle involved in inverting the containers for turning them upright and with short guide rod.

Still further, since the L-shaped plates 23 for pressing the containers are secured to the endless chain 22 at equal intervals by way of the elastic members 24 such as rubber, the containers are turned at the elastic members 24 even if they are unexpectedly blocked by some reason during the convenyance thereof, which does not damage the container carrying apparatus seriously.

What is claimed is:

1. A container carrying apparatus for discharging rectangular parallelepiped containers from an intermittent driving container carriage conveyor whereon each rectangular parallelepiped container is nipped at front and rear portions thereof in a carrying direction, each rectangular parallelepiped container having a top and a bottom, and each container being carried in an upside-down state and movable on the intermittent driving container carriage conveyor in a direction crossing at right angles with the container carrying direction of the conveyor, said apparatus comprising:

a means for discharging each parallelepiped container which stops at a container discharge position of the intermittent driving container carriage conveyor in a stable state where the container is inclined aslant upward in an advancing direction in a direction crossing at right angles with the container carrying direction of the conveyor, and a means for turning each discharged rectangular parallelepiped container upright.

2. The container carrying apparatus according to claim 1, wherein the means for turning the rectangular parallelepiped container upright comprises an upright guide member and a container pressing member.

3. The container carrying apparatus according to claim 2, wherein the container pressing member comprises a mechanism for pressing the rectangular parallelpiped container at a region including a gravity or rotary center thereof.

4. The container carrying apparatus according to claim 1, wherein the container pressing member comprises a mechanism for pressing the rectangular parallelepiped container at a region including a gravity or rotary center thereof.

5. A container carrying apparatus for discharging rectangular parallelepiped containers comprising:

an intermittent driving container carriage conveyor that nips each rectangular parallelepiped container at front and rear portions thereof in a carrying direction and that carries each rectangular parallelepiped container, having a top and a bottom, in an upside-down state, the intermittent driving container carriage conveyor nipping the containers so that they are movable in a direction crossing at right angles with the container carrying direction of the conveyor, a guide member extending in a direction crossing at right angles with the intermittent driving container carriage conveyor, and a container pressing member for discharging the rectangular parallelepiped containers from the intermittent driving container carriage conveyor and pressing the rectangular parallelepiped containers which are guided by the guide member while turning the rectangular parallelepiped containers.

\* \* \* \* \*